United States Patent [19]

Marchetti

[11] 4,310,604
[45] Jan. 12, 1982

[54] FUEL CELL SYSTEM AND TEMPERATURE CONTROL THEREFORE

[75] Inventor: Peter G. Marchetti, Newtown, Conn.

[73] Assignee: Energy Research Corporation, Danbury, Conn.

[21] Appl. No.: 168,487

[22] Filed: Jul. 14, 1980

[51] Int. Cl.³ .............................................. H01M 8/04
[52] U.S. Cl. ........................................ 429/17; 429/13; 429/24; 429/26
[58] Field of Search ....................... 429/13, 17, 27, 24, 429/26

[56] References Cited

U.S. PATENT DOCUMENTS

| | | | |
|---|---|---|---|
| 3,198,664 | 8/1965 | Kunz | 429/26 X |
| 4,182,795 | 1/1980 | Baker et al. | 429/13 |
| 4,192,906 | 3/1980 | Maru | 429/13 |
| 4,202,933 | 5/1980 | Reiser et al. | 429/13 |

*Primary Examiner*—Charles F. Lefevour

[57] ABSTRACT

A fuel cell system wherein incoming process gas to the cell is provided by adjustably combining respective amounts of outgoing heated process gas and fresh supply gas via a means responsive to the temperature of the former gas to maintain the fuel cell at a predetermined temperature.

34 Claims, 2 Drawing Figures

FUEL CELL SYSTEM AND TEMPERATURE CONTROL THEREFORE

BACKGROUND OF THE INVENTION

This invention relates to the electrochemical cells, and in particular, to electrochemical cells provided with thermal control.

In the design of electrochemical cells, such as fuel cells and batteries of the type wherein reactant or process gas is conducted to the cells for electrochemical reaction, thermal control is a dominant factor. One seemingly desirable technique for realizing such control involves the utilization of the sensible heat from the process gas itself. In this technique the incoming process gas may be supplied to the fuel cell at a temperature below the desired cell operating temperature and at a flow level above that required to obtain a preselected cell output power. The additional process gas at the lower temperature then acts to remove heat simply by increasing its temperature during passage through the cell. In this type of system, it is also usual to recover unused outgoing heated process gas and, after suitable cooling and water removal, add same to the fresh supply gas to provide the required in-flow of process gas to the cell.

U.S. Pat. No. 3,198,664 discloses a typical system of the aforesaid type. A vastly improved system of this type is disclosed in U.S. patent application Ser. No. 923,363 assigned to the same assignee.

While the last mentioned system successfully provides temperature control, alternative systems are still being investigated.

It is an object of the present invention to provide an electrochemical cell system wherein thermal control is effected in a simple, passive and automatic manner.

It is a further object of the present invention to provide a fuel cell system wherein automatic and simple thermal control is provided during operating periods and automatic hermetic sealing during non-operating periods.

SUMMARY OF THE INVENTION

In accordance with the principles of the present invention, the above and other objectives are realized in an electrochemical cell system and method wherein the incoming process gas to the cell is provided by combining a first amount or flow level of heated process gas outgoing from the cell with a second amount or flow level of fresh supply process gas, and by adjusting these first and second amounts to maintain the cell at a predetermined temperature. The adjustment of the first and second amounts of outgoing heated process gas and fresh supply gas is via a temperature sensitive means which is responsive to the temperature of the heated gas.

In the particular embodiment of the invention to be disclosed hereinafter, a conduit means having a passage in communication with the input and output manifolds of the cell and with the source of fresh supply gas is provided. The temperature sensistive means is in the form of a charged bellows whose expansion and contraction controls a damper assembly which effects passage of the first and second amounts of the heated process gas and supply gas through the conduit passage to the cell input manifold.

BRIEF DESCRIPTION OF THE DRAWING

The above and other features and aspects of the present invention will become more apparent upon reading the following detailed description in conjunction with the accompanying drawings, in which.

DETAILED DESCRIPTION

Figure 1:
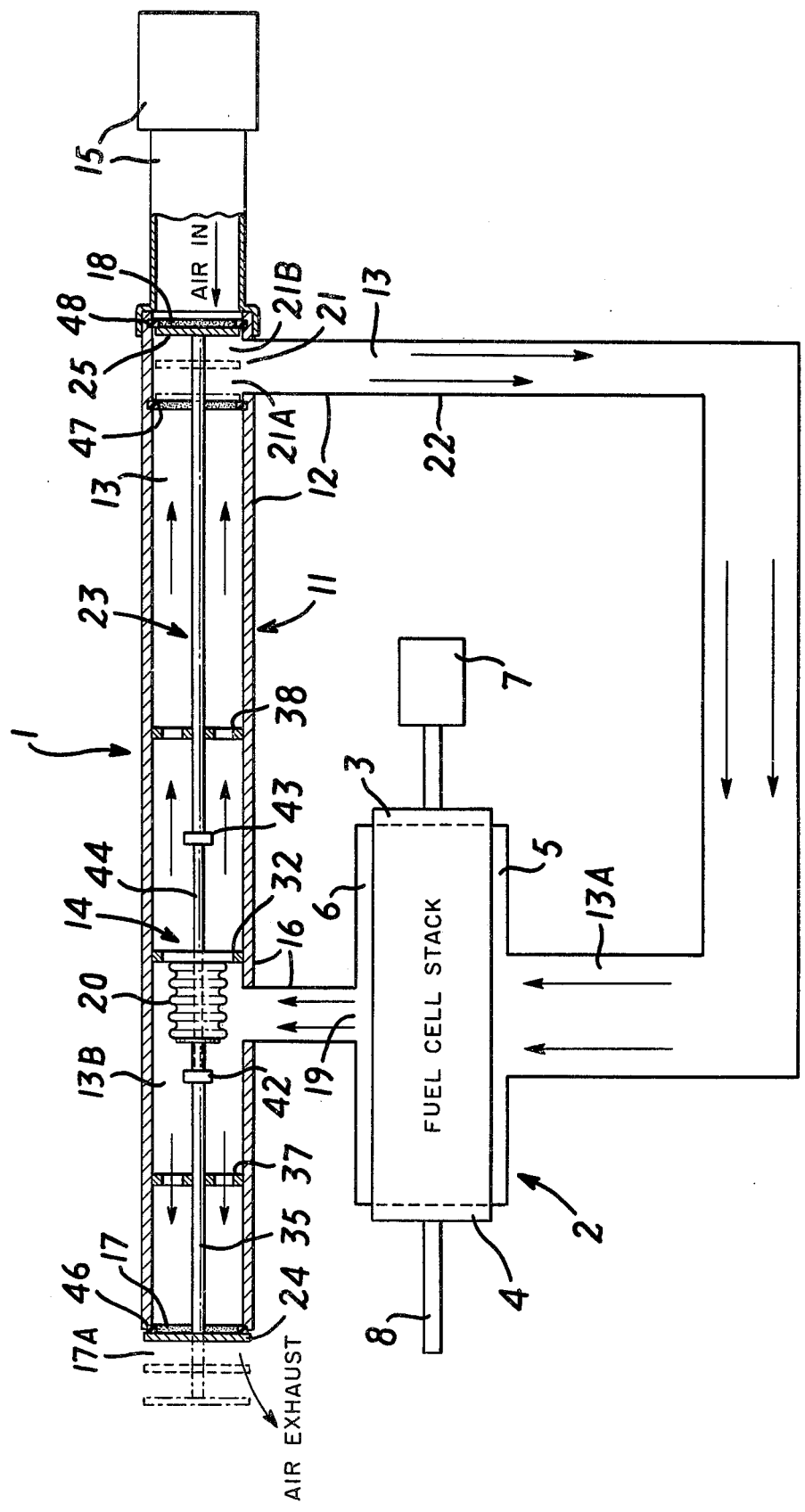
FIG. 1 illustrates schematically an electrochemical cell system in accordance with the principles of the present invention.

In FIG. 1, electrochemical cell system 1 comprises a fuel cell stack 2 having corresponding sets of input and output manifolds 3 and 4 and 5 and 6, respectively, serving the anode and cathode sides of the stack. Input manifold 3 receives process gas (fuel gas) from a fuel supply 7 and conveys same as incoming fuel gas to the stack 2. Unused outgoing fuel gas is expelled through output manifold 4 to an exhaust conduit 8. Further process gas (oxidant gas) is received by the input manifold 5 which conveys same as incoming oxidant gas to the stack, while unused oxidant gas outgoing from the cell is expelled from the output manifold 6.

Attendant the operation of the stack 2 to provide a predetermined or desired output electrical power through electrochemical reaction of the fuel and oxidant gases, is the production of heat which increases with continued cell operation. This heat, if not maintained at a predetermined temperature associated with the desired cell output power, will cause a reduction in output power and eventual destruction of the stack 2. Accordingly, a temperature control system 11 is provided to ensure maintenance of the cell temperature at the predetermined level.

In accordance with the principles of the present invention, the system 11 provides temperature control through forming the incoming process gas from a combination of respective amounts of outgoing heated process gas and fresh supply process gas, these amounts being automatically adjusted to ensure cell temperature at the predetermined level. In the present illustrative example, temperature control is brought about by forming the incoming oxidant process gas from first and second amounts of outgoing heated oxidant process gas and fresh supply oxidant process gas. However, it is within the contemplation of the invention to provide such control by establishing the incoming fuel process gas or both the incoming fuel process gas and the incoming oxidant process gas in such manner. Where fuel process gas control is to be provided, a system similar to that to be described for the system 11 can be used.

The system 11 comprises a conduit 12 having a passage 13 whose one end 13A communicates with the input manifold 5 and whose other end 13B communicates with the output manifold 6. Temperature responsive means 14 situated in the passage 13 is responsive to the temperature of the outgoing heated oxidant gas from the output manifold 6 and controls the amount of such gas and the amount of fresh supply oxidant gas from a suppy 15 to be coupled to the passage end 13A and, therefore, to the input manifold 5.

Figure 2:
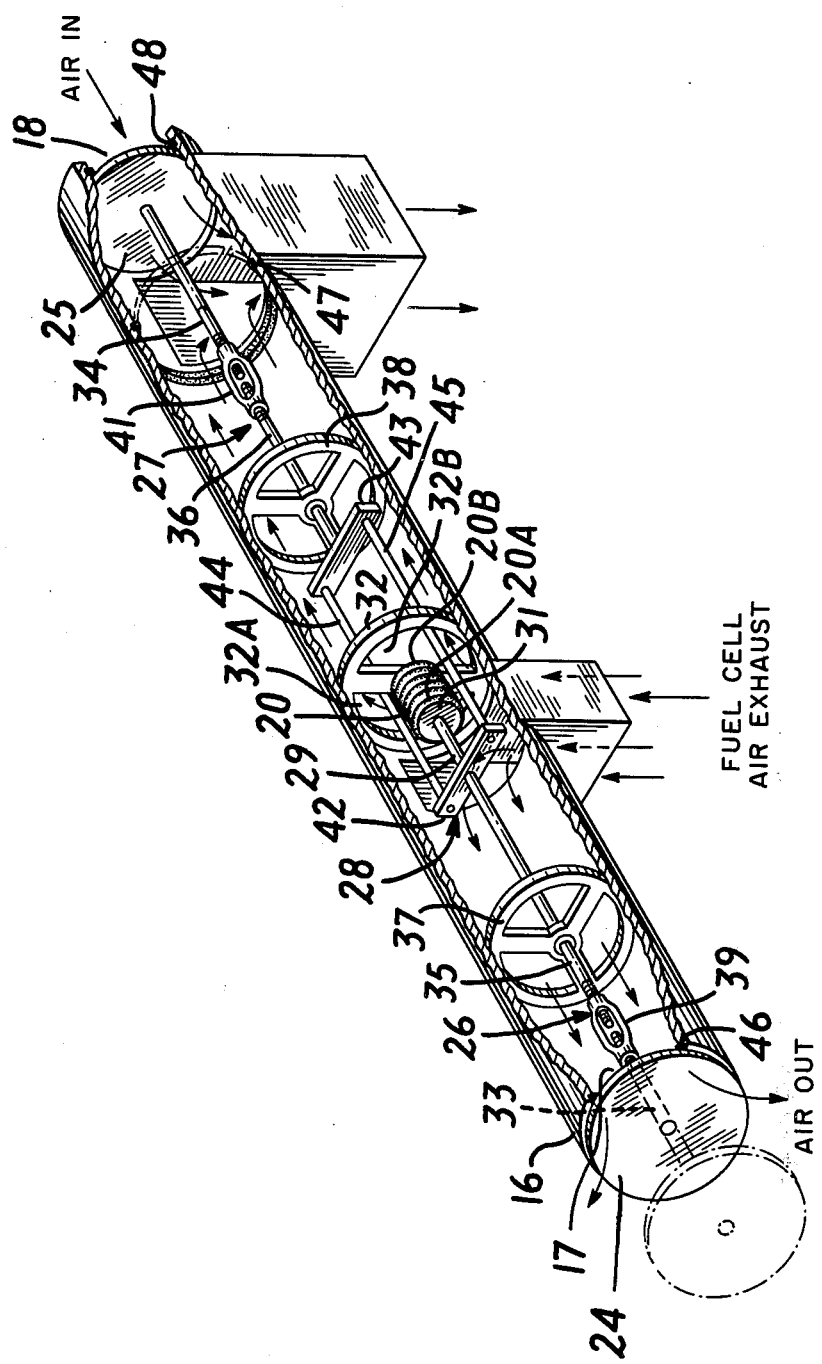
FIG. 2 shows in greater detail the temperature control system of the cell system of FIG. 1.

More particularly, referring both to FIGS. 1 and 2, the conduit 12 comprises a first conduit section 16 having first and second ports 17 and 18 at its opposite ends, the port 18 being fed by the supply 15 and the port 17 serving to exhaust the portion of the outgoing heated oxidant gas not utilized to form the incoming oxidant gas. Third and fourth ports 19 and 21 are also provided in the section 16. The port 19 communicates with the output manifold 6 and receives the outgoing heated oxidant gas from the stack 2. The port 21 couples respective portions of the outgoing heated oxidant gas and the fresh supply oxidant gas to a second conduit section 22. Conduit section 22 extends from the port 21 to the input manifold 5.

Temperature responsive means 14 controls the relative amounts of outgoing heated oxidant gas and fresh supply oxidant gas coupled through port 21 by adjusting the respective access regions 21A and 21B of the port 21, and by simultaneously adjusting the exhaust region 17A of the exhaust port 17. More particularly, the control means 14 comprises a fluid charged bellows 20 which operates a damper assembly 23 comprised of first and second dampers or plates 24 and 25 situated adjacent the ports 17 and 21, respectively. Damper 24 is of area sufficient to totally block the port 17 when in abutting relationship thereto. As shown, the damper is disposed exterior to the section 12 and defines with the port 17 the exhaust region 17A. Damper 25, in turn, is of area equal to the cross sectional area of the section 12 and defines with the port 21 the access regions 21A and 21B.

As seen more clearly in FIG. 2, the damper assembly further includes component structure for supporting the dampers 24 and 25 and for interconnecting same to the bellows 20. Thus, first and second tie rod assemblies 26 and 27 connect the dampers 24 and 25 to a yoke assembly 28 which is connected through an acutaing rod 29 to an acutator plate 31 carried by the free end 20A of the bellows 20. The other end 20B of the bellows is held fixed by a support plate 32 which is rigidly held against the inner wall of the section 16. The tie rod assemblies 26 and 27 are of similar construction and comprise first rod sections 33, 34 connected to the respective dampers and second rod sections 35, 36 connected to the yoke assembly. Bearing plates 37, 38 slidably support the rod sections 33, 34 to permit adjustment of the tie rod length. The rod sections 35, 36 connect to yoke assembly transverse members 42, 43 which, in turn, are coupled by connecting rods 44, 45. The latter pass through apertures 32A, 32B in the support plate 32, while the transverse member 42 is further connected to the actuating rod 29.

As further shown in FIG. 1, an O-ring 46 is provided in contiguous relationship with the inner wall of the section 16 at the port 17 to provide an effective seal when the damper 24 is in engaging relationship with the port. Similarly, O-rings 47, 48 are provided contiguous the section 16 inner wall adjacent opposite ends of the port 21. These rings are engaged by the damper 25 when at such port ends to thereby effect a gas seal thereat.

As above-indicated, the temperature control system 11 provides control of the stack 2 temperature by controlling the respective amounts of outgoing oxidant gas and oxidant supply gas coupled through the access regions 21A and 21B and combined in the conduit 12 for passage to the passage end 13A adjacent the cell input port 5. In practice, the bellows is designed to undergo expansion at a temperature above the minimum reaction temperature of the cell. A typical temperature at which bellows expansion begins might be 250° F. for a cell having a minimum reaction temperature of 225° F. Moreover, the conduit sections 16 and 22 are selected to establish flow in excess of that required for electrochemical reaction at the predetermined cell temperature which might, for example, be 325° F. The oxidant supply is typically air, preferably, at ambient temperature (e.g., about 72° F.).

In operation, the fuel cell stack 2 is initally at rest with no process gas flow therethrough and, thus, in an unheated condition. The oxidant gas at the bellows is, therefore, likewise unheated and the bellows 20 is in its maximum contracted position. In this position, the actuating rod 29 and yoke assembly 28 move the respective rod assemblies 26 and 27 rightward thereby moving the dampers 24 and 25 into sealing engagement with the O-rings 46 and 48. The access regions 17A and 21B are thereby reduced to zero expanse and the access region 21A to maximum expanse. In this condition, the cathode side of the stack 2 is placed in an hermetically sealed condition.

To bring the fuel cell into operation, the oxidant gas initially in the conduit 22 is preheated by a heat exchanger (not shown) situated in the conduit line to the cell reaction temperature and a blower (also not shown) in the line 22 causes circulation of the heated oxidant gas and, therefore, application of the gas as incoming oxidant gas to the stack 2. Fuel gas is then supplied to the stack 2 manifold for passage through the stack.

Due to electrochemical reaction, the stack 2 produces electrical energy from the incoming oxidant and fuel gases. As a product of this reaction, heat is generated by the cell causing a heating of unused oxidant gas outgoing from the cell through manifold 6. This gas passes through the port 19 into the conduit 16 and, in doing so, contacts the bellows 20, which, in the case shown, is directly above the port 19. Since the bellows does not begin to expand until raised to a temperature above the stack minimum reaction temperature, the bellows remains in its contracted position as initial outgoing heated oxidant gas passes through the conduit 16. At this time, the dampers 24 and 25 remain in their initial positions, maintaining the access region 21A at its maximum expanse and the access region 21B and exhaust region 17A at their minimum zero expanses.

As the stack 2 continues to operate, the stack 2 temperature increases above the temperature at which the bellows 20 expands. At this point, the outgoing oxidant gas, which now also is at this increased temperature, in contacting the bellows causes expansion thereof. Such expansion results in leftward movement of the free end 20A of the bellows and, accordingly, leftward movement of the dampers 24 and 25 through actuating rod 29, yoke assembly 28 and rod assemblies 26 and 27. The dampers are thus moved leftward of the O-rings 46 and 48, causing the exhaust region 17A to increase from its minimum zero expanse and the access region 21A to decrease from its maximum expanse. A portion of the outgoing heated oxidant gas is thus expelled from the conduit 16 through the region 17A, while the remaining part is carried by the conduit to the access region 21A. At the same time, the access region 21B is increased from its minimum zero expanse allowing fresh supply oxidant gas to pass through this region.

The heated oxidant gas and the fresh supply gas pass through the respective regions 21A and 21B and into the conduit 22. The gases are combined therein to form a composite gas which is now at a lower temperature than the outgoing heated oxidant gas, the combined gas being conveyed by the conduit 22 to the manifold 5 as incoming oxidant gas.

The aforesaid process continues until the bellows expands to a position whereat the dampers 24 and 25 are positioned to provide an exhaust region 17A and access regions 21A and 21B of expanses which proportion the amounts of heated oxidant gas returned and exhausted and the amount of fresh supply gas taken in to result in a temperature equilibrium in the stack at the preselected temperature. When this condition ensues, the stack temperature remains at the preselected temperature and the heated outgoing oxidant gas ceases to increase in temperature. The bellows thus stops expanding and maintains the equilibrium positions of the dampers 24 and 25 and, therefore, the respective relationship of the regions 17A, 21A and 21B. The amount of heated outgoing oxidant gas and fresh supply gas combined in the conduit 22 is thereby held constant, as is temperature of the combined gas as it is applied to the cell at the input manifold 5.

Any additional increases in temperature of the cell are now manifested as temperature increases in the outgoing heated oxidant gas which causes further expansion of the bellows 20. This results in further increasing the expanse of exhaust region 17A, further decreasing the expanse of access region 21A, and further increasing the expanse of access region 21B. Less heated outgoing oxidant gas and additional fresh supply gas at the lower temperature are thereby fed into the conduit 22, whereby the temperature of the composite gas is lowered sufficiently to lower the stack temperature. This continues until the stack temperature returns to the preselected temperature, at which time the bellows will have contracted and moved the dampers to their respective equilibrium positions.

If the stack temperature now should decrease below the preselected temperature, the opposite operation occurs. Thus, the bellows is further contracted causing rightward movement of the dampers, thereby decreasing the expanses of regions 17A and 21B and increasing the expanse of region 21A. This reduces the amount of outgoing oxidant gas exhausted, increases the amount of such gas recirculated and decreases the amount of fresh supply oxidant gas taken in. The composite gas in conduit 22 is thus increased in temperature, thereby increasing the stack 2 temperature. Again this continues until the stack 2 temperature is at the preselected temperature, at which temperature the bellows brings the dampers to their equilibrium positions.

As can be appreciated, the temperature control system 11 of the invention thus acts to control temperature of the stack 2 by adjusting the relative amounts of outgoing heated oxidant gas and lower temperature fresh supply gas which are combined for use as incoming oxidant gas to the stack. Once equilibrium is reached, temperature control occurs through raising and lowering the temperature of the composite gas whose flow remains essentially constant but whose relative proportions of heated and fresh supply oxidant gas varies. Moreover, the aforesaid variation occurs automatically through a bellows and damper assembly which with the stack inoperative also provides hermetic sealing.

With the present system, the fresh supply of oxidant gas need not itself be heated, since heating occurs through combination with the outgoing heated oxidant gas. Thus, as above-indicated, the fresh supply may be at ambient temperature.

The bellows utilized with the present invention may be gas, liquid or otherwise charged and may be biased so as to provide expansion at the required temperatures.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. An electrochemical cell system comprising: a fuel cell having a cathode section and an anode section for receiving incoming process gases, respectively;

and means for maintaining said fuel cell at a first predetermined temperature comprising:

means for combining a first amount of heated process gas outgoing from one of said sections with a second amount of fresh supply process gas to form said incoming process gas for said one section;

and means preceding said combining means and responsive to the temperature of said outgoing heated process gas from said one section for adjusting said first amount of heated process gas and for adjusting said second amount of fresh supply process gas to enable said incoming gas formed by said combining means from said first and second amounts of gases to maintain the temperature of said fuel cell at said first predetermined temperature.

2. A system in accordance with claim 1 wherein: said supply gas is at a temperature below that of said heated process gas.

3. A system in accordance with claim 2 wherein: said supply gas is at ambient temperature.

4. A system in accordance with claim 1 wherein: the flow of said incoming process gas to said one section is maintained at a substantially constant level.

5. A system in accordance with claim 4 wherein: said flow level is above that required to provide a predetermined output potential of said fuel cell at said first predetermined temperature.

6. A system in accordance with claim 1 wherein: said temperature responsive means is responsive to temperatures equal to or above a preselected second temperature which is above the reaction temperature of the fuel cell.

7. A system in accordance with claim 1 wherein: said first and second amounts are adjustable to substantially zero.

8. A system in accordance with claim 1 wherein: said one section is one of said anode and cathode section.

9. A system in accordance with claim 1, wherein: said combining means comprises:

a conduit having a passage communicating with said heated outgoing process gas from said one section and said fresh supply gas and having an end communicating with said one section for conveying said incoming supply gas to said one section.

10. A system in accordance with claim 9 wherein: said temperature responsive means includes a charged bellows situated in said passage and adapted to initiate expansion at a temperature below said first predetermined temperature.

11. A system in accordance with claim 10 wherein: said temperature responsive means further includes:

a first damper responsive to said bellows and arranged to allow, respectively, said first and second amounts of said outgoing heated gas from said one section and said fresh supply to reach said end of said passage.

12. A system in accordance with claim 11 wherein:
said conduit includes first and second conduit portions; said first conduit portion having first and second ports and third and fourth ports situated between said first and second ports, said second and third ports communicating with said outgoing heated process gas from said one section and said fresh supply gas, respectively, and said fourth port being situated between said second and third ports and being connected to said second conduit portion which extends from said fourth port to said one section;
said first damper is movable between said fourth and second ports;
said bellows is situated in said first conduit portion; and said temperature responsive means further includes a second damper responsive to said bellows and movable into and out of engagement with said first port.

13. A system in accordance with claim 12 wherein:
said bellows causes said first and second dampers to sealingly close said second and first ports, respectively, when the temperature of said outgoing process gas from said one section, is below a second predetermined temperature lower than said first predetermined temperature.

14. A system in accordance with claim 13 wherein:
said second damper is movably supported in said first conduit portion between a first position in which it sealingly engages said first port and a second position in which it is disengaged from said first port;
said first damper is movably supported within said first conduit portion between a first position in which it sealingly engages said first conduit portion adjacent one end of said fourth port and a second position in which it sealingly engages said first conduit portion adjacent the other end of said fourth port.

15. A system in accordance with claim 14 wherein:
said first damper sealingly engages said second port in said second position.

16. A system in accordance with claim 14 in which:
said dampers are in said first positions when the temperature of the outgoing heated process gas of said one section is below said second predetermined temperature and in said second positions when the temperature of the outgoing heated process gas is above a third predetermined temperature higher than said first predetermined temperature.

17. A system in accordance with claim 16 wherein:
said system further includes means for connecting said dampers to said bellows;
and said expansion of said bellows is sufficient to move said dampers from said first to said second positions during a change in the temperature of said process gas from said second to said third predetermined temperatures.

18. A system in accordance with claim 17 wherein:
said bellows is fluid charged.

19. A system in accordance with claim 17 wherein:
said bellows is rigidly fixed at one end and moveable at its other end;
and said connecting means connects each damper to said other end of said bellows.

20. A system in accordance with claim 19 wherein:
said connecting means includes:
first and second connecting rods, said first connecting rod being connected to one of said dampers and said second connecting rod being connected to the other other of said dampers;
and means for coupling said first and second connecting rods to said other end of said bellows.

21. A system in accordance with claim 20 wherein:
said coupling means comprises a yoke assembly.

22. A system in accordance with claim 21 wherein:
said yoke assembly comprises first and second members connected to and transverse of said first and second rods;
and third and fourth members extending between corresponding ends of said first and second members.

23. A system in accordance with claim 22 further comprising:
a support plate rigidly mounted in said first conduit portion and supporting said fixed end of said bellows;
and first and second bearing plates rigidly mounted in said first conduit portion and slidably supporting said first and second rods.

24. A system in accordance with claim 23 wherein:
said bellows is supported above said third port.

25. A system in accordance with claim 24 wherein:
said second damper is external of said first conduit portion.

26. A system in accordance with claim 25 further comprising:
first sealing means arranged to border the periphery of said first port and second and third sealing means arranged to border the inner periphery of said first conduit portion adjacent the respective end of said fourth port and engaged by said first and second dampers when in said first positions and said second damper when in said second position.

27. A system in accordance with claim 26 wherein:
each of said sealing means is an O-ring.

28. A method of producing electrical energy through electrochemical reaction in a fuel cell having anode and cathode sections adapted to receive incoming process gas comprising the steps of:
combining a first amount of heated process gas outgoing from one of said sections with a second amount of fresh supply process gas to form the incoming process gas for that one section;
and preceding said combining step, adjusting said first amount of heated process gas and adjusting said second amount of fresh supply process gas in dependence on the temperature of said outgoing gas from that one section to enable said incoming process gas formed in said combining step from said first and second amounts of gases to maintain the temperature of said cell at a first predetermined temperature.

29. A method in accordance with claim 28 wherein:
said supply gas is at a temperature below that of said heated process gas.

30. A method in accordance with claim 29 wherein:
said supply gas is at ambient temperature.

31. A method in accordance with claim 28 wherein:

said step of adjusting is carried out as to maintain the incoming gas to said one section at a substantially constant flow level.

32. A method in accordance with claim 28 wherein: said substantially constant flow level is above that required to provide a predetermined output potential of said fuel cell at said first predetermined temperature.

33. A method in accordance with claim 28 wherein: said step of adjusting is carried out by varying said first amount from values equal to or greater than zero and by varying said second amount from values equal to or greater than zero.

34. A method in accordance with claim 28 wherein: said one section is said cathode section.

* * * * *